(12) United States Patent
Dunn et al.

(10) Patent No.: US 7,552,903 B2
(45) Date of Patent: Jun. 30, 2009

(54) MACHINE MOUNTING SYSTEM

(75) Inventors: Jeffrey H. Dunn, San Diego, CA (US); Ian T. Brown, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 163 days.

(21) Appl. No.: 11/301,430

(22) Filed: Dec. 13, 2005

(65) Prior Publication Data
US 2007/0131839 A1 Jun. 14, 2007

(51) Int. Cl.
*F16M 1/00* (2006.01)

(52) U.S. Cl. .................... 248/678; 248/637; 60/797

(58) Field of Classification Search .............. 248/637, 248/638, 639, 646, 671, 673, 678; 60/796, 60/797
See application file for complete search history.

(56) References Cited

U.S. PATENT DOCUMENTS

| | | | |
|---|---|---|---|
| 2,099,898 A | 11/1937 | Larkin | |
| 2,529,955 A | 11/1950 | Morley | |
| 2,531,178 A * | 11/1950 | Nest | 60/687 |
| 3,021,100 A * | 2/1962 | Verhota | 248/646 |
| 3,241,314 A | 3/1966 | Fields | |
| 3,330,514 A * | 7/1967 | Williams | 248/678 |
| 3,613,821 A | 10/1971 | Kerr | |
| 3,675,418 A * | 7/1972 | Lenkeit et al. | 60/797 |
| 4,501,973 A * | 2/1985 | Fenemore et al. | 290/1 A |
| 4,603,821 A * | 8/1986 | White | 244/54 |
| 4,638,971 A | 1/1987 | Basinsky et al. | |
| 4,660,796 A * | 4/1987 | Garrec | 248/544 |
| 4,875,655 A | 10/1989 | Bender et al. | |
| 5,028,001 A | 7/1991 | Bender et al. | |
| 5,160,113 A | 11/1992 | Whiddon | |
| 5,452,575 A * | 9/1995 | Freid | 60/797 |
| 6,022,048 A | 2/2000 | Harshbarger et al. | |
| 6,230,481 B1 * | 5/2001 | Jahr | 60/796 |
| 2004/0035633 A1 | 2/2004 | Bergman et al. | |

FOREIGN PATENT DOCUMENTS

JP 2005-041247 2/2005

OTHER PUBLICATIONS

"Genetech: P.T.O. generators 16-69 kVA" [online] Oct. 24, 2002 p. 1-2, XP002421122 http://web.archive.org/web/20021024163556/ http://www.genetech.se/pdf/Ti-20077E.pdf.

* cited by examiner

*Primary Examiner*—Anita M King
(74) *Attorney, Agent, or Firm*—Liell & McNeil

(57) ABSTRACT

A gas turbine engine assembly includes a gas turbine engine mounted on a three-point mounting frame. The three-point mounting frame includes an engine support structure having first and second beams in a V-configuration, and a secondary support structure that is positioned about the engine support structure and has a rectangular footprint. The frame may include a Y-configuration that includes the V-configuration, and may be implemented in a machine mounting system, such as in a marine vessel.

30 Claims, 5 Drawing Sheets

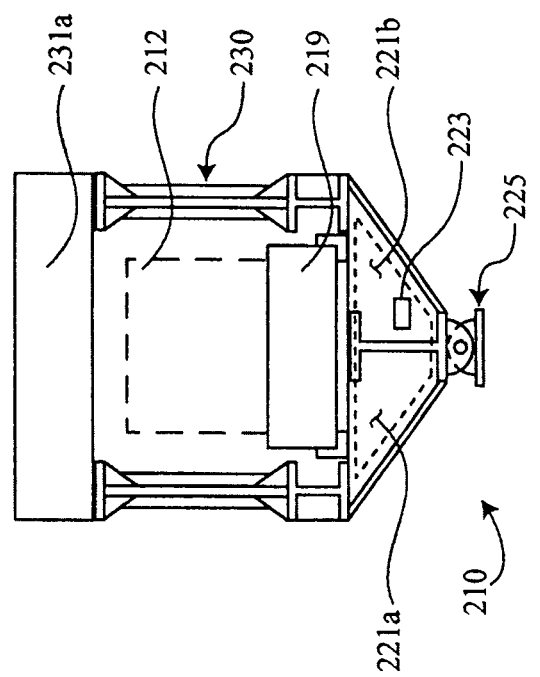
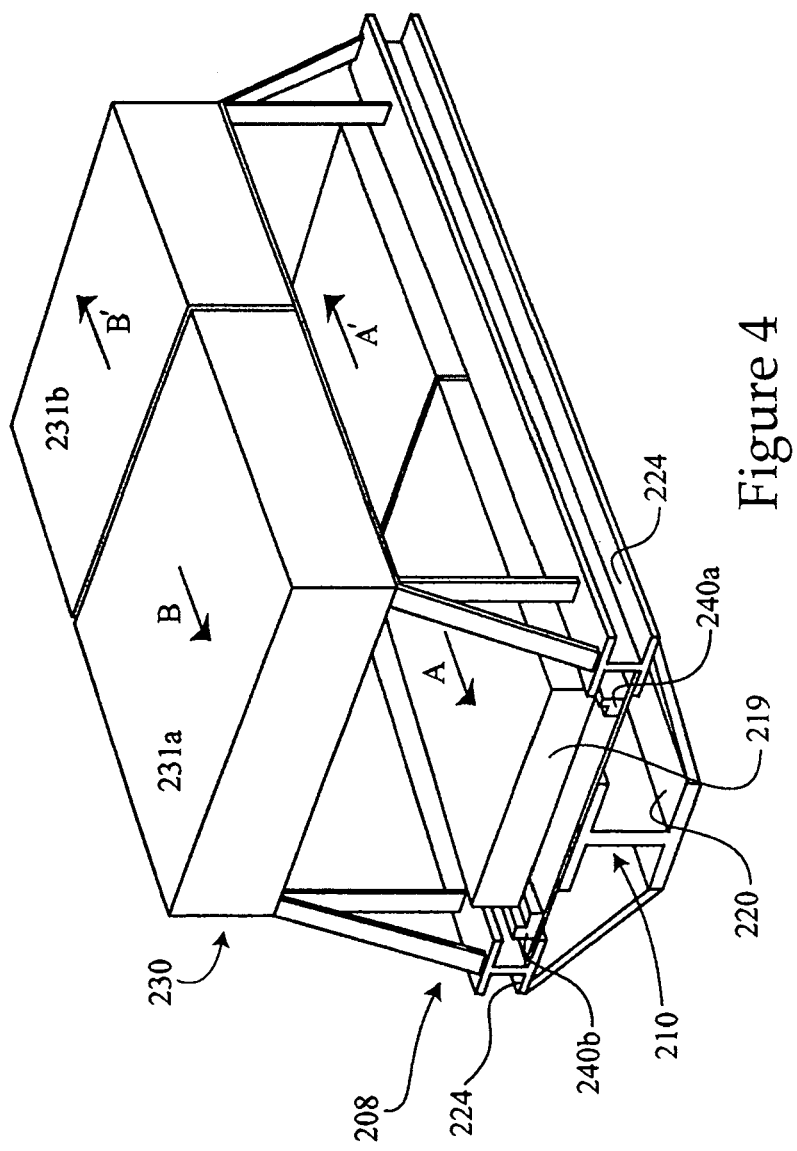

MACHINE MOUNTING SYSTEM

TECHNICAL FIELD

The present disclosure relates generally to mounting apparatuses for Machines, such as gas turbine engines, and relates more particularly to a three-point Frame with first and second beams joined in a V-configuration.

BACKGROUND

Specialized mounting systems have been necessary for machines and all manner of mechanical devices since the dawn of the industrial era. It has been found that for relatively large, bulky machines such as certain engines, mounting systems must often be developed which can provide robust support and stability to the machine, while being tailored to specific machine designs. Mounting strategies often must further account for the environments in which a particular machine will operate.

The marine industry provides a number of examples of particular operating environments requiring specialized machine mounting systems to properly support large, heavy machines. This is due at least in part to the motion and vibrations typically experienced by marine vessels. An otherwise flat, generally planar vessel deck may experience torsional motion under the influence of wave action or other vibration and mechanical stresses, and in turn may transmit the torsional motion to the mounting systems for machines carried on the vessel. Many engine-driven components have a rectangular mounting format and, accordingly, many engine or other machine systems have four or more mounting points.

Due to such torsional motion, however, four-point mounting systems for onshore applications are typically not ideal for offshore systems. Twisting of a vessel's deck can cause the mounting points of a four-point system to actually move out of the originally intended mounting plane. For equipment having a low tolerance for misalignment of components, inadequate mounting can be fatal. In an attempt to address the above problems, engineers typically take a four-point mounting frame and simply mount it on three mounting members for marine applications. This approach, however, has drawbacks of its own.

In an aerospace context, one example of a specialized mounting system for an aircraft engine is known from U.S. Pat. No. 5,028,001 to Bender et al. Bender et al. describe a method for coupling an engine to a support frame which mounts to a fuselage of an aircraft. The method uses a three-point vibration isolating mounting system in which load reactive forces at each of the mounting points are statically and dynamically determined. A first vibration isolating mount pivotally couples a first end of a support beam to the engine, allowing a pivoting action therebetween. An opposite end of the supporting frame is coupled to the engine with a pair of vibration isolating mounts which are oriented such that they are pivotable about a circumference of the engine. While the design of Bender et al. certainly has useful applications, it appears to be engineered for a specific engine type, and thus suffers from lack of flexibility in its applications.

The present disclosure is directed to one or more of the problems or shortcomings set forth above.

SUMMARY OF THE DISCLOSURE

In one aspect, a three-point frame for a machine mounting system is provided. The three-point frame includes a machine support structure including first and second beams joined in a V-configuration. A secondary support structure having a rectangular configuration is positioned about the machine support structure.

In another aspect, the present disclosure provides a gas turbine engine assembly including a gas turbine engine, and a three-point mounting frame for the gas turbine engine. The three-point mounting frame includes an engine support structure having first and second beams in a V-configuration, and a secondary support structure positioned about the engine support structure with a rectangular footprint.

In still another aspect, the present disclosure provides a marine vessel having a marine vessel body. A gas turbine engine including a driver and at least one driven component is further provided. A three-point mounting frame is provided having an engine support structure with a first beam and a second beam joined in a V-configuration. Three mounting members are coupled with the frame.

BRIEF DESCRIPTION OF THE DRAWINGS

FIG. 4 illustrates a marine cradle assembly in accordance with the present disclosure;

FIG. 5 is an end view of the marine cradle assembly of FIG. 4;

DETAILED DESCRIPTION

Figure 1:
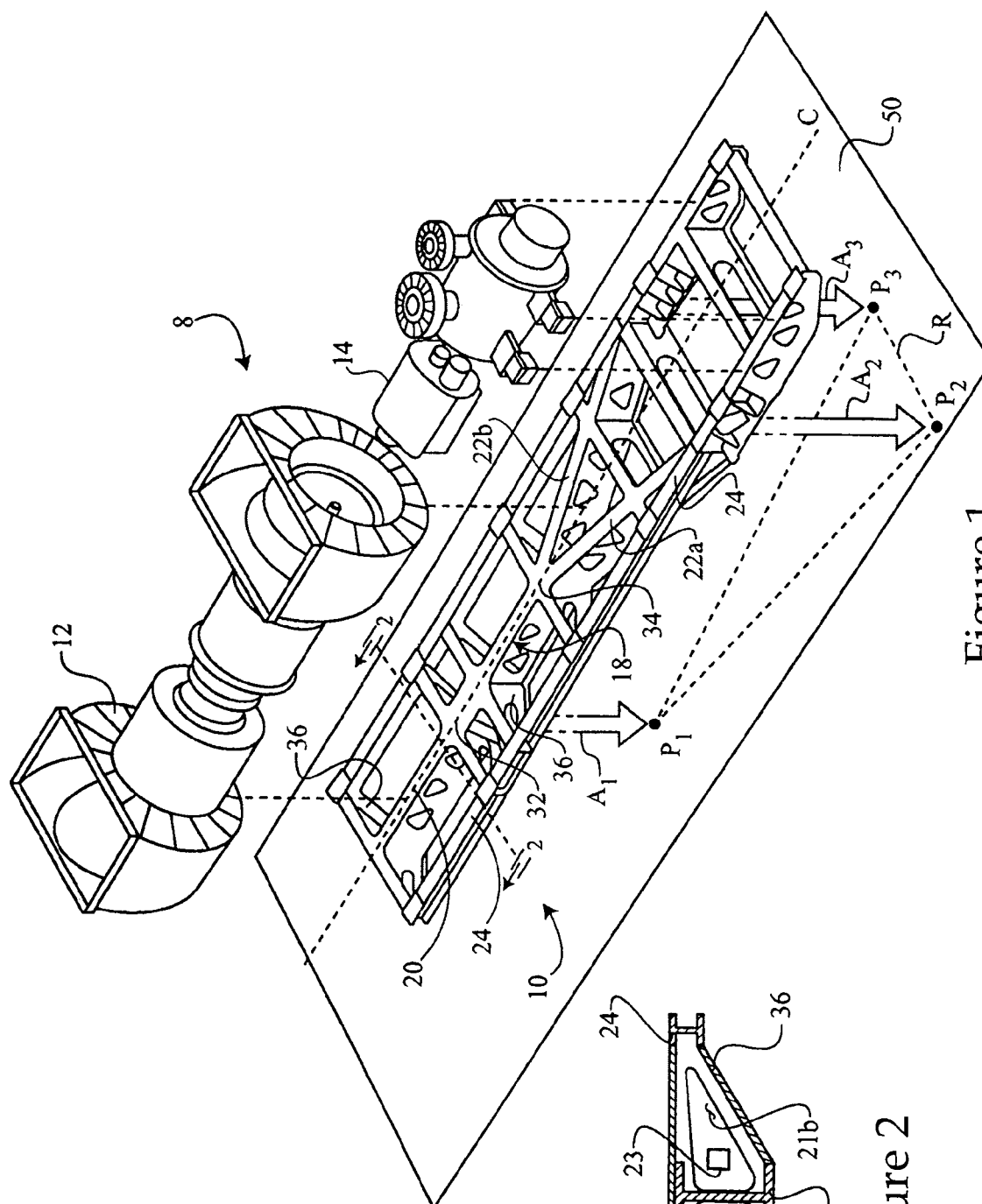
FIG. 1 illustrates a gas turbine engine assembly according to the present disclosure.

Referring to FIG. 1, there is shown an engine assembly 8, which may be a gas turbine engine assembly, according to the present disclosure. Assembly 8 includes a gas turbine engine driver component 12 and a driven component 14, such as a compressor and gearbox having a rectangular mounting configuration. Driver component 12 and driven component 14 may be coupled with a machine mounting frame 10. Frame 10 includes first and second beams 22a and 22b joined in a V-configuration and defining a predetermined three-point load path, illustrated with vector arrows $A_1$, $A_2$ and $A_3$ in FIG. 1.

Frame 10 may further be mounted to a mounting platform 50, such as a marine vessel body, via mounting members (not shown in FIG. 1) positioned at points $P_1$, $P_2$ and $P_3$, defining a mounting plane R which is oriented parallel to beams 22a and 22b. When platform 50 experiences torsional stresses, points $P_1$, $P_2$ and $P_3$ remain substantially within a common plane, although this plane may actually differ from plane R as torsional stresses cause movements such as twisting of platform 50. The geometry and construction of frame 10 allows positioning of the mounting members at optimal load-bearing points between frame 10 and mounting platform 50. The load path to mounting platform 50 is predetermined in that one of the three mounting points, $P_1$ in FIG. 1, will always lie along a centerline C of frame 10 bisecting the V-configuration formed by beams 22a and 22b. Similarly, the other mounting points, $P_2$ and $P_3$ in FIG. 1 will lie generally proximate ends of beams 22a and 22b opposite the ends at which beams 22a and 22b are joined. The actual positions chosen for each of points $P_1$, $P_2$ and $P_3$ may be adjusted to positions that are optimal for the load type, geometry and design of frame 10.

It should be appreciated that while assembly 8 is particularly well-suited to a gas turbine engine assembly, the present disclosure is not thereby limited. Other machines or engine types such as reciprocating engines might be substituted for the gas turbine engine of FIG. 1 without departing from the scope of the present disclosure. Similarly, while driven component 14 may comprise a gearbox and a compressor, a wide variety of other driven components such as a pump, generator or driveshaft might be substituted for driven component 14 without departing from the intended scope of the present disclosure.

Beams 22a and 22b will typically be coupled with a third beam 20 to form a machine support structure 18 having a Y-configuration that includes the aforementioned V-configuration. It is contemplated that machine support structure 18 will serve as a primary load carrying component of frame 10, supporting much or all of the weight of gas turbine engine driver component 12 thereon. A secondary support structure 24 having a rectangular configuration and defining a rectangular footprint is positioned about machine support structure 18 and may be connected therewith via a plurality of lateral bulkheads 36 positioned at selected length positions of frame 10. It is contemplated that secondary support structure 24 may support all or most of the weight of gas turbine engine driven component 14, transferring the load to machine support structure 18 via bulkheads 36, for example. The rectangular configuration of secondary support structure 24 allows driven components having a rectangular mounting configuration to be readily coupled with frame 10.

Each of machine support structure 18 and secondary support structure 24 may be formed from standard metallic I-beams. With respect to machine support structure 18, it may comprise first and second I-beams 22a and 22b coupled together, and coupled to a third I-beam 20 at a first structural node 34. Third beam 20 may actually comprise one, two or more I-beam sub-components joined at another structural node 32. All of the I-beams, bulkheads and structural nodes making up frame 10 may be welded or bolted together, and may be formed from commercially available I-beams and/or bulkheads, or may be formed by welding together flat plates to create components having the desired configuration. Structural nodes 32 and 34 may comprise a different material than the various beams of frame 10, and may be formed as separate modular pieces. Alternatively, nodes 32 and 34 may represent merely points where the respective components are joined together.

Figure 2:
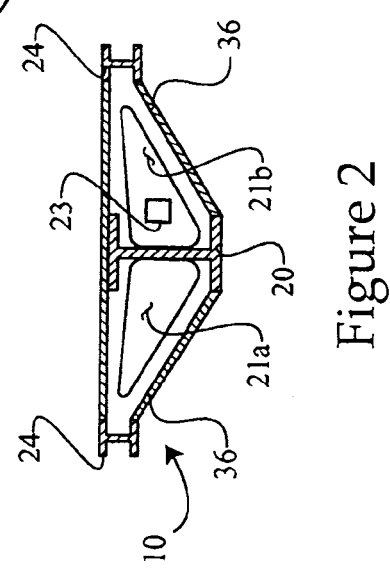
FIG. 2 illustrates a sectioned view of a portion of the assembly of FIG. 1 taken along Line 2-2 thereof.

Referring also to FIG. 2, there is shown a sectioned end view of frame 10 taken along line 2-2 of FIG. 1. As illustrated in FIG. 2, joining of beam 20 with secondary support structure 24 via bulkheads 36 may have the added benefit of providing for easily constructed fluid tanks 21a and 21b, one on each side of beam 20. To form fluid tanks 21a and 21b, additional sheet stock may be welded to the underside of frame 10 to create tanks on each side and extending along the length of beam 20, the structural members of frame 10 thereby serving as baffles for the fluid tanks. In such an embodiment, tanks 21a and 21b serve the additional purpose of providing torsion boxes for enhancing the stiffness of frame 10. A fluid pump 23 may be disposed within one or both of tanks 21a and 21b.

Figure 3:
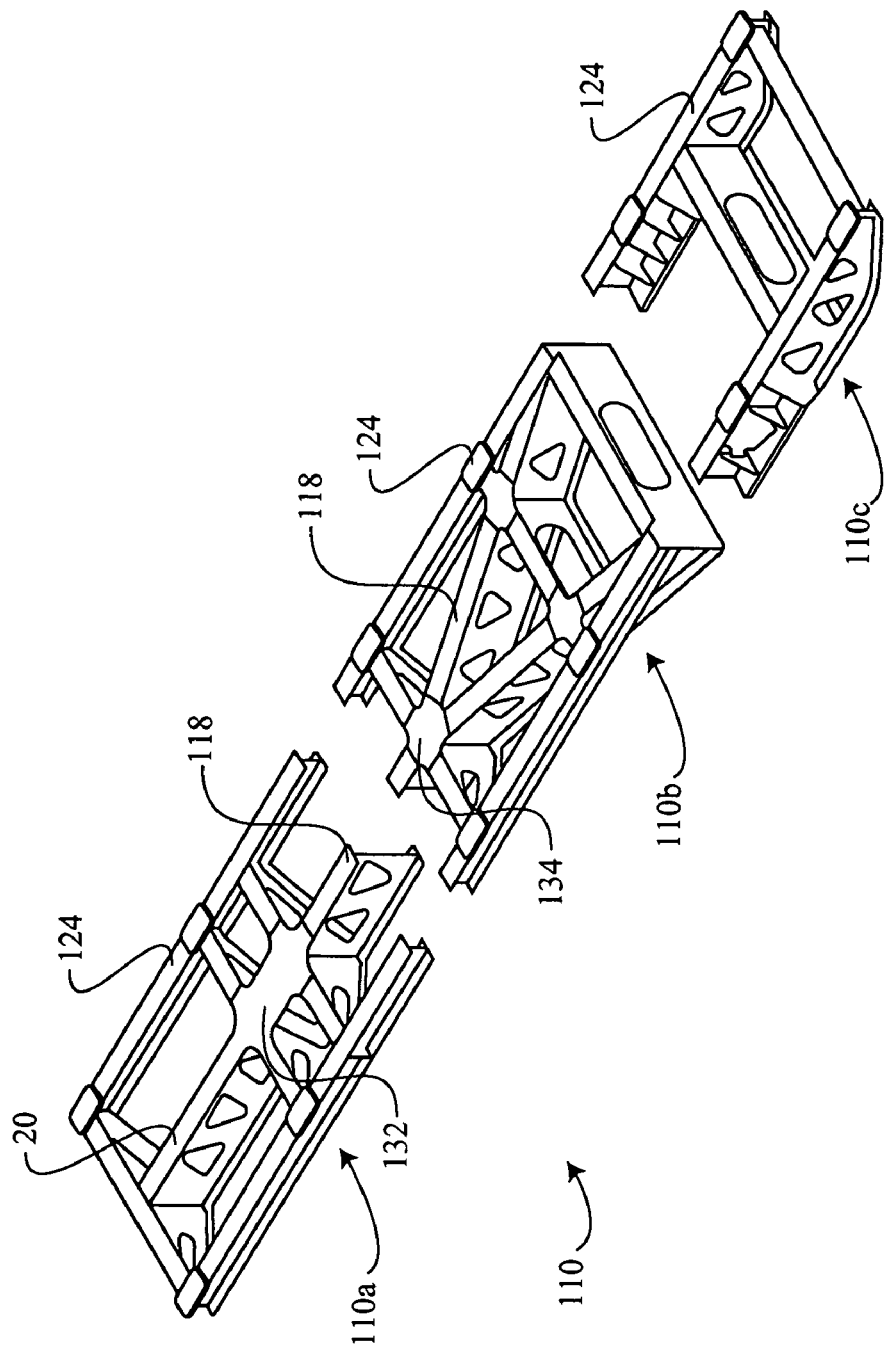
FIG. 3 is a perspective view of a frame for a machine mounting system according to the present disclosure.

Turning to FIG. 3, there is shown in perspective another embodiment of a frame 110 according to the present disclosure. Frame 110 is similar to frame 10 of FIG. 1, but differs in that rather than being constructed as a unitary piece, three separate frame modules or frame units are used. In particular, a first module 110a or first frame unit is provided which includes a portion of machine support structure 118, a structural node 132 and a portion of rectangular support structure 124. A second module 110b or second frame unit is provided, including another portion of machine support structure 118 and another portion of rectangular support structure 124, and another structural node 134. Yet a third module 110c or third frame unit is provided, including a portion of rectangular support structure 124. The embodiment of FIG. 3 is contemplated to be particularly applicable in designs wherein it is desirable to adapt a length of frame 110 for driver and/or driven components having different lengths. For example, for gas turbine engines of different sizes, frame 110 could be constructed with an end module 110a selected to have a size corresponding with that of the gas turbine engine. In other words, a plurality of modules might be manufactured, and a module having the desired length selected as module 110a, allowing the frame design to be adapted for different size components. The use of structural nodes 132 and 134 is further contemplated to improve the fatigue life of joints within frame 110. Embodiments are contemplated wherein structural nodes formed from one type of material are coupled with I-beam components formed of another type of material. The various modules/components of frame 110 of FIG. 2, as well as the other frames described herein, may be assembled via a dry fit process using known tab joint systems, or by any other suitable process.

Turning now to FIG. 4, there is shown a marine cradle assembly 208 according to the present disclosure. Cradle assembly 208 includes a frame 210, which may include a Y-configuration machine support structure (a third beam 220 is shown), and a secondary support structure 224 coupled therewith. Cradle assembly 208 differs from the foregoing described embodiments in that it may include a rail mounting design for sliding a package 219 into a desired mounting position on frame 210. In particular, cradle assembly 208 may include first and second rails 240a and 240b, allowing a package such as an engine 219 to slide into a desired mounting position, in either of first and second slide directions A and A'. Cradle assembly 208 may further include an enclosure 230 having a sliding roof with first and second roof panels 231a and 231b mounted above frame 210 and slidable in sliding directions B and B'. In addition to enclosing package 219, enclosure 230 further stiffens and strengthens cradle assembly 208.

Referring also to FIG. 5, there is shown an end view of cradle assembly 230 of FIG. 4. Similar to the embodiment described with respect to FIG. 1, first and second fluid tanks 221a and 221b which are integral with portions of frame 210 may be provided, and a pump 223 disposed therein. Frame 210 may be mounted on one or more gimbals 225 at one or more of the mounting points. Anti-vibration mounts may also be used, or a combination anti-vibration mount and gimbal as such are known in the art. The other three-point mounting systems of the present disclosure may similarly be mounted via gimbals, anti-vibration mounts or combination anti-vibration mounts and gimbals.

FIG. 5 further illustrates another package 212 on top of package 219. While the lower package 219 might be any type of machine mounted to frame 210 and within rails 240a and 240b, package 219 might also be another frame for mounting a gas turbine engine, e.g. package 212. In other words, rather than sliding a gas turbine engine package within rails 240a and 240b, a frame might be slid therein, and the actual gas turbine engine components mounted thereon. Thus, frame 210 may serve as a sub-base to which another mounting frame may be coupled, for instance a driver frame and a driven component frame positioned on top of frame 210. Such an embodiment facilitates retrofit applications wherein it is desirable to take an existing machine mounting system, for instance an onshore gas turbine engine assembly, and transfer the machine mounting system to an offshore environment. The base and sub-base concepts are also contemplated to be well-suited to particularly large and heavy applications, such as for heavier compressor installations.

While it is contemplated that cradle 208 may benefit through the use of enclosure 230, the enclosure is not a critical component thereof. Similarly, although the use of mounting rails 240a and 240b is described in the context of cradle 208, mounting rails might similarly be used with any of the other embodiments of the present disclosure described herein. Further still, while the sub-base concept is discussed in the context of marine cradle 208, other embodiments of the present disclosure might be used as a sub-base, or in conjunction therewith.

Figure 6:
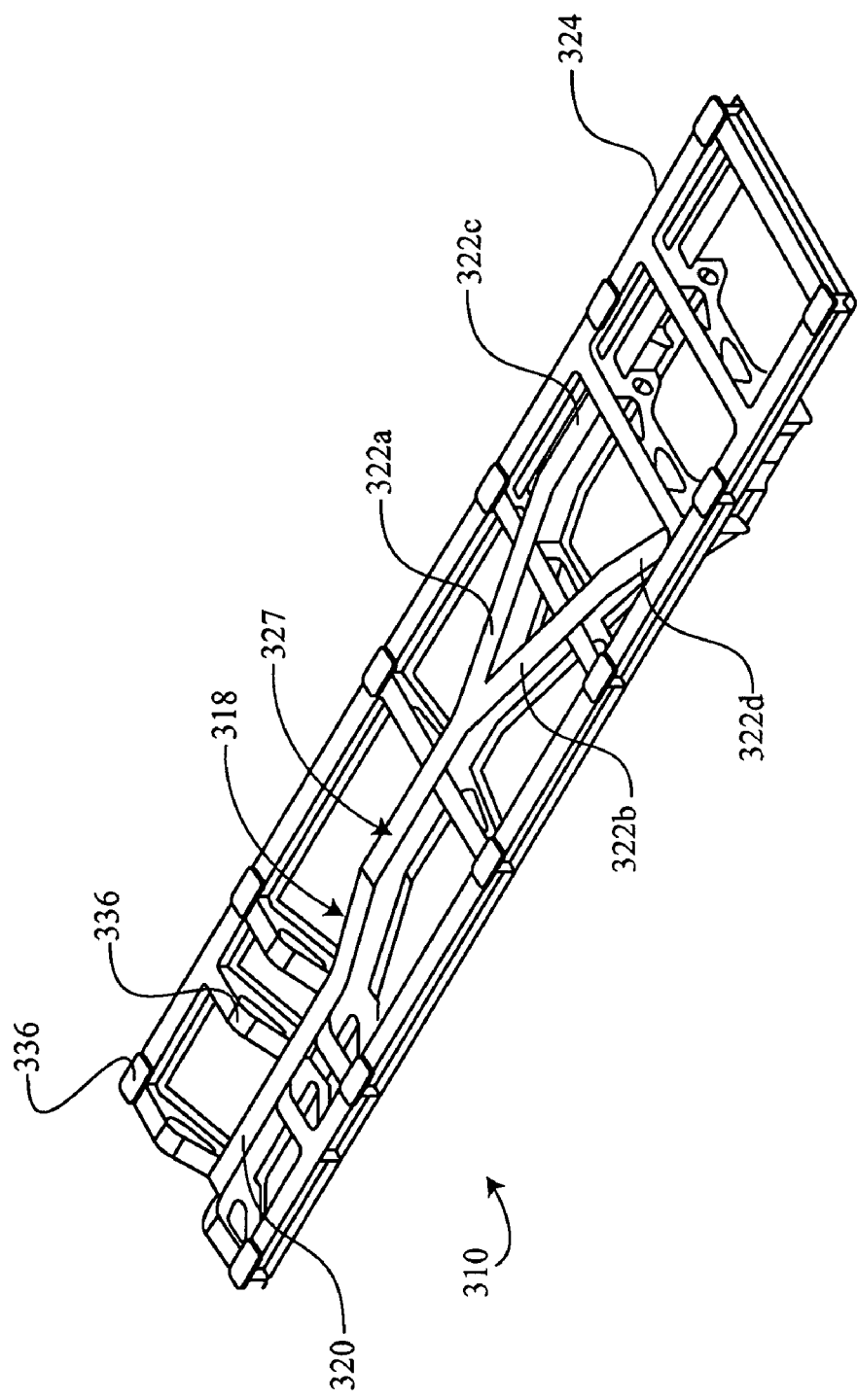
FIG. 6 is a perspective view of a frame for a machine mounting system according to another embodiment of the present disclosure.

Referring now to FIG. 6, there is shown yet another embodiment of the present disclosure including a three-point frame 310. Frame 310 is similar to the foregoing embodiments, but differs in that it includes a "bridge" configuration for machine support structure 318. In particular, in the embodiment of FIG. 6, machine support structure includes first and second beams in a V-configuration, joined with a third beam 320 to define a Y-configuration. Each of the first and second beams includes a first portion 322a, 322b, respectively, and a second portion 322c and 322d, respectively. The respective first portions 322a and 322b may be disposed substantially in the same plane with a central bridge portion 327 that is part of third beam 320, whereas the respective second portions 322c and 322d may angle downwardly relative to bridge portion 327.

In frame 310, it is possible to vertically position the secondary support structure 324 independently of the machine support structure. The sizing and shape of bulkheads 336 may be varied to alter the relative vertical positions of the respective frame components. In general, the bridging of the machine support structure serves to stiffen the overall structure of frame 310, which is contemplated to be beneficial where mounting particularly heavy equipment.

Figure 7:
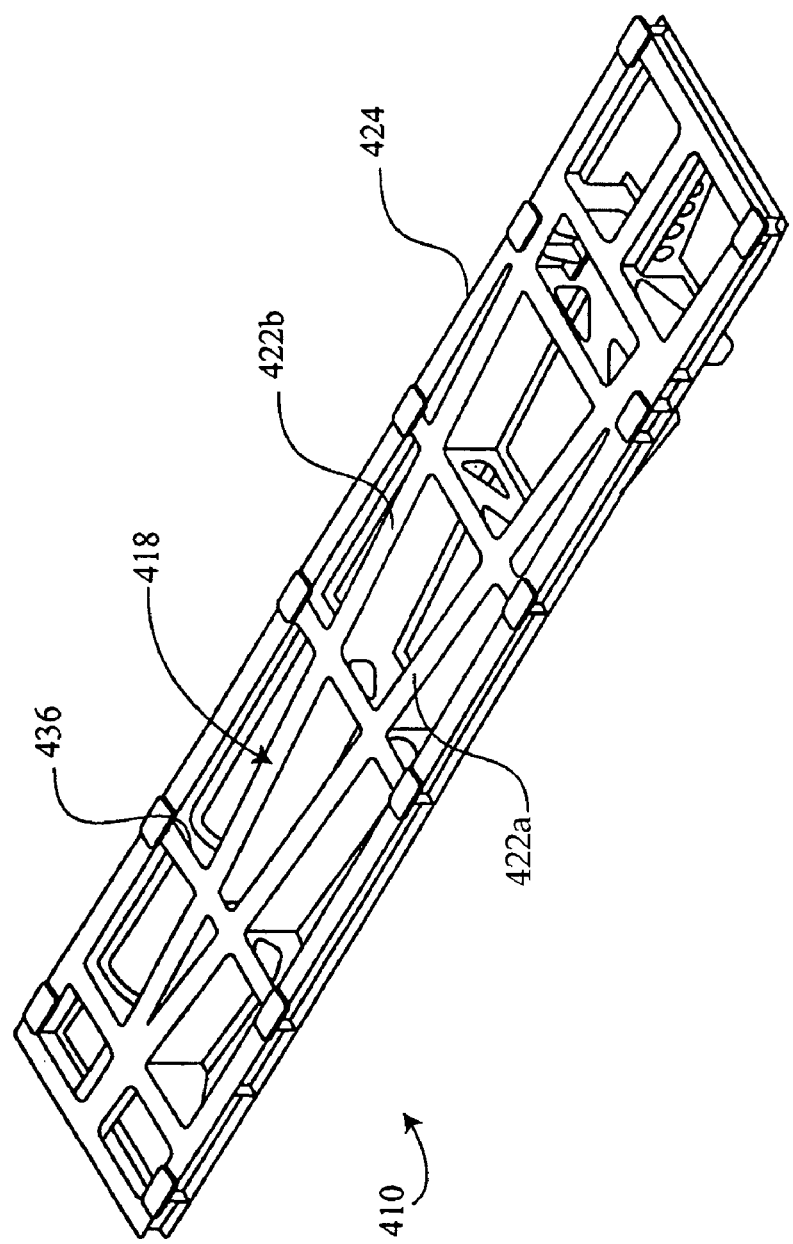
FIG. 7 is a perspective view of a frame for a machine mounting system according to yet another embodiment of the present disclosure.

Referring now to FIG. 7, there is shown yet another embodiment of a frame 410 according to the present disclosure. Frame 410 includes a machine support structure having first and second beams 422a and 422b arranged in a V-configuration, and a rectangular support structure 424 positioned about machine support structure 418. Frame 410 differs from other embodiments described herein in that the machine support structure is made up of only two beams. A plurality of bulkheads 436 connect machine support structure 418 with secondary support structure 424.

INDUSTRIAL APPLICABILITY

Referring to the drawing Figures generally, frames 10, 110, 210, 310 and 410 will all share the basic machine support structure having first and second beams in a V-configuration. The use of the V-configuration allows a predetermined three-point load path to a mounting platform such as a marine vessel body or other structure. Plane R will typically be oriented parallel a component mounting plane defined by secondary support structure 24, and an engine mounting plane defined by machine support structure 18. In certain embodiments, the component mounting plane or component mounting interface will be coplanar with the machine mounting plane or interface, whereas in other embodiments they may be non-coplanar to provide a multi-level frame or multi-level marine cradle.

When mounting platform 50 experiences torsional motion, for example, where a marine vessel deck comprising platform 50 twists, mounting points $P_2$ and $P_3$ may move relative to point $P_1$. Frame 10, 110, 210, 310, 410 will typically be mounted at point P1 via a rotatable mounting member such as the gimbal shown in FIG. 5, allowing the entire structure supported by the frame to rotate or rock back and forth at one end about its mounting point $P_1$. Twisting of support platform 50 can thus take place without substantially disturbing the essentially planar configuration of the triangular mounting interface. This behavior differs from earlier, four-point machine mounting designs wherein two sets of mounting points at opposite ends of a machine mounting frame are by definition forced out of a mounting plane by torsional movement of the support platform.

The present disclosure thus provides a versatile, adaptable structural concept for machine mounting, in particular for offshore environments wherein the mounting support platform may be subjected to torsional movement. As described herein, the structural concepts of the present disclosure may include single level frames, multi-level frames, modular split frames and multi-frame base/sub-base structures. By combining a rectangular component interface with the overall V-configuration or Y-configuration concepts, many standard driven components which are configured for rectangular mounting may be easily coupled to and supported by the three-point mounting frames described herein. Still further variation may be achieved by adjusting the size, number, thickness and spacing of the bulkheads which connect the respective support structures. This flexibility provides a substantial advantage over many earlier designs wherein frames had to be custom built or modified to accommodate components not originally designed for offshore use. Moreover, frames according to the present disclosure have more consistent mounting forces than many earlier designs, allowing for optimum and consistent placement of additional mounting hardware such as the gimbals and/or anti-vibration mounts described herein. Where these concepts are implemented in the context of a marine cradle, machines designed for onshore use such as gas turbine engine assemblies and driven components can be easily integrated into offshore applications.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. For instance, while it is contemplated that the machine support structure will typically be somewhat more robust than the secondary support structure, this need not be the case. For example, rather than the relatively thinner structural components of secondary support structure 24 shown in FIG. 1, larger, thicker beams might be used to accommodate relatively heavier driven components or more than one driven component. The rectangular support structure might also be connected with one or more of the three mounting members, depending on the application. Further still, while the present description discusses assembling various selected modules to arrive at the fully constructed frame, other portions of the frame might be formed as modular units than the specific modular units described herein. For instance, each of the described structural nodes might be coupled with one or more of the beams of the machine support structure to form separate modules. These modules could then be custom combined with portions of the secondary support structure. Other aspects, features and advantages will be apparent upon an examination of the attached drawing Figures and appended claims.

What is claimed is:

1. A three-point frame for a machine mounting system comprising:
a machine support structure including first and second beams joined in a V-configuration;
a secondary support structure having a rectangular configuration, positioned about said machine support structure; and
a triangular mounting interface for three mounting members corresponding with a predetermined three-point load path of said frame;
wherein said frame includes a longitudinal centerline bisecting said V-configuration, and said machine support structure further comprises a third beam aligned with said centerline and coupled with said first and second beams in a Y-configuration that includes said V-configuration, and wherein said frame further includes a length aligned with said longitudinal centerline and the secondary support structure is coupled with the machine support structure at a plurality of load transference locations along said length.

2. The three-point frame of claim 1 further comprising:
a plurality of lateral bulkheads extending across a width of said frame and connecting said machine support structure with said secondary support structure; and
at least one integral tank defined in part by at least two of said plurality of lateral bulkheads.

3. The three-point frame of claim 2 wherein said at least one integral tank comprises two tanks extending along opposite sides of said third beam and each comprising a portion of a torsion box.

4. The three-point frame of claim 1 wherein:
the first and second beams are part of a driven component module; and
the third beam is part of a driver module coupled with said driven component module, said driver module being selected from among a plurality of driver modules having varying configurations.

5. The three-point frame of claim 4 further comprising a structural node corresponding with a connection point for said first and second beams, and another structural node corresponding with a connection point for first and second portions of said third beam.

6. The three-point frame of claim 1 wherein:
said machine support structure defines an engine mounting interface in a plane;
said secondary support structure defines a component mounting interface in a different plane; and
said triangular mounting interface being in a plane parallel each of the planes of the engine mounting and component mounting interface.

7. The three-point frame of claim 1 wherein said machine support structure defines an engine mounting interface and said secondary support structure defines a component mounting interface coplanar with said engine mounting interface.

8. The three-point frame of claim 1 wherein said machine support structure comprises an arched bridge configuration defining an engine mounting interface.

9. A gas turbine engine assembly comprising:
a gas turbine engine;
a three-point mounting frame for said gas turbine engine, said frame including an engine support structure having first and second beams in a V-configuration, and a secondary support structure positioned about said engine support structure and having a plurality of beams surrounding the engine support structure and including a rectangular footprint, the secondary support structure being coupled with the first beam of the machine support structure at a first load transference location and coupled with the second beam of the machine support structure at a second load transference location; and
three mounting members arranged in a triangular configuration corresponding to a predetermined three-point load path of said frame;
said engine support structure including a third beam coupled with said first and second beams and defining a Y-configuration that includes said V-configuration.

10. The gas turbine engine assembly of claim 9 wherein said frame includes a length dimension, further comprising a plurality of lateral bulkheads coupling the engine support structure with the secondary support structure at a plurality of predetermined length positions of said frame.

11. The gas turbine engine assembly of claim 10 wherein:
the first, second and third beams of said Y-shaped frame each comprise a plurality of connected flat plates; and
said frame includes a structural node joint between said first and second beams, and another structural node joint between first and second portions of said third beam.

12. The gas turbine engine assembly of claim 10 wherein said frame comprises a base frame, said gas turbine engine mounted to a rectangular driver frame positioned upon said base frame.

13. The gas turbine engine assembly of claim 12 further comprising:
a driven component frame; and
first and second mounting rails positioned upon said base frame and extending parallel said length dimension;
wherein said driver frame and said driven component frame are slidably mounted to said base frame via said first and second mounting rails.

14. A marine vessel comprising:
a marine vessel body;
a three-point mounting frame mounted to said marine vessel body at three mounting points defining a mounting plane, and having an engine support structure with a first beam and a second beam joined in a V-configuration oriented parallel said mounting plane, and the frame including a secondary support structure having a rectangular configuration positioned about said engine support structure;
a gas turbine engine assembly mounted to said three-point mounting frame and including a driver and at least one driven component; and
three mounting members corresponding one with each of said mounting points.

15. The marine vessel of claim 14 wherein:
said engine support structure further comprises a third beam coupled with said first and second beams, said engine support structure defining a Y-configuration that includes said V-configuration.

16. The marine vessel of claim 15 further comprising:
a plurality of frame stiffening oil tanks housed within said frame;
a rail-supported driver frame and a rail-supported driven component frame; and
an engine enclosure mounted to said rectangular secondary support structure.

17. The marine vessel of claim 16 wherein said frame comprises a portion of a multi-level marine cradle.

18. A three-point frame for mounting a gas turbine engine assembly comprising:
a machine support structure configured to support a gas turbine engine assembly mounted along a longitudinal centerline of said three-point frame, said machine support structure having a plurality of beams, including a first beam and a second beam in a V-configuration bisected by said longitudinal centerline;
a secondary support structure coupled with said machine support structure;
a first frame unit that includes at least one of the plurality of beams of said machine support structure; and
a second frame unit that is separate from said first frame unit and configured to couple with said first frame unit, wherein said second frame unit also includes at least one of the plurality of beams of said machine support structure, and wherein said three-point frame is configured via a three-point load path defined by said machine support structure to transfer loads to three points on a mounting platform corresponding with the three-point load path.

19. The three-point frame of claim 18 wherein said secondary support structure is positioned about said machine support structure and coupled with said machine support structure via a plurality of lateral bulkheads, said secondary support structure having a rectangular footprint and defining a mounting plane for a component of said gas turbine engine assembly, said machine support structure also defining a mounting plane for a component of said gas turbine engine assembly which is parallel the mounting plane defined by said secondary support structure.

20. A three-point frame for mounting a gas turbine engine assembly comprising:
a machine support structure configured to support a gas turbine engine assembly mounted along a centerline of said three-point frame, said machine support structure having a plurality of beams, including a first beam and a second beam in a V-configuration bisected by said centerline;
a secondary support structure coupled with said machine support structure;
a first frame unit that includes at least one of the plurality of beams of said machine support structure; and
a second frame unit that is separate from said first frame unit and configured to couple with said first frame unit, wherein said second frame unit also includes at least one of the plurality of beams of said machine support structure, and wherein said three-point frame is configured via a three-point load path defined by said machine support structure to transfer loads to three points on a mounting platform corresponding with the three-point load path;
wherein said machine support structure comprises a plurality of I-beams including said first beam and said second beam, said plurality of I-beams being coupled together in a Y-configuration that includes said V-configuration, and wherein at least one of said first frame unit and said second frame unit includes a structural node comprising a material different from said I-beams and coupling together a plurality of said I-beams.

21. A gas turbine engine assembly comprising:
a gas turbine engine;
a three-point frame configured to support said gas turbine engine, and including a machine support structure having a plurality of beams arranged in a Y-configuration, and a secondary support structure coupled with said machine support structure and including a second plurality of beams arranged in a rectangular configuration that surrounds the machine support structure; and
three mounting members arranged in a triangular configuration corresponding to a predetermined three-point load path defined by said machine support structure, including a first mounting member located along a centerline of said three-point frame, a second mounting member and a third mounting member.

22. The gas turbine engine assembly of claim 21 wherein said machine support structure includes a first beam having a first end and a second end and a second beam also having a first end and a second end, said first beam and said second beam being joined at their respective first ends and arranged in a V-configuration which is part of said Y-configuration, and wherein said second mounting member is located proximate the second end of said first beam and said third mounting member is located proximate the second end of said second beam.

23. A mounting frame for an engine comprising:
a machine support structure having a longitudinal centerline and including:
a first elongated beam positioned on a first side of said centerline and angled relative to said centerline; and
a second elongated beam positioned on a second side of said centerline opposite said first side and angled relative to said centerline, the first and second beams lying substantially in a common plane that is parallel to said centerline;
first, second, and third mounts mounted to the machine support structure for supporting the frame on a mounting platform;
the first, second, and third mounts arranged in a "Y" pattern where the first mount is aligned with said longitudinal centerline, and the second mount is aligned with said first beam, and the third mount is aligned with said second beam; and
the mounting frame further comprising a plurality of lateral bulkheads attached to the machine support structure.

24. A mounting frame according to claim 23 further comprising a third beam aligned with said longitudinal centerline.

25. A mounting frame according to claim 24 wherein said first, second, and third beams of the machine support structure form a "Y" pattern.

26. A mounting frame according to claim 25 further comprising a secondary support structure having a rectangular footprint and positioned about the machine support structure, the secondary support structure coupled to the machine support structure via the plurality of lateral bulkheads.

27. A mounting frame for an engine comprising:
a machine support structure having a longitudinal centerline and including:
a first elongated beam positioned on a first side of said centerline and angled relative to said centerline; and
a second elongated beam positioned on a second side of said centerline opposite said first side and angled relative to said centerline;
the first and second beams lying substantially in a common plane that is parallel to said centerline;
the first and second beams forming a "V" shape which is bisected by said longitudinal centerline;
a plurality of lateral bulkheads attached to the machine support structure; and
at least one fluid tank formed by the machine support structure and the plurality of lateral bulkheads.

28. A mounting frame for an engine according to claim 27 further comprising:
- first, second, and third mounts mounted to the machine support structure for supporting the frame on a mounting platform;
- the first, second, and third mounts arranged in a "Y" pattern where the first mount is aligned with said longitudinal centerline, and the second mount is aligned with said first beam, and the third mount is aligned with said second beam.

29. A mounting frame according to claim 28 further comprising a third beam aligned with said longitudinal centerline.

30. A mounting frame according to claim 29 wherein said first, second, and third beams of the machine support structure form a "Y" pattern.

* * * * *